(12) United States Patent
Kennan et al.

(10) Patent No.: US 7,875,694 B2
(45) Date of Patent: Jan. 25, 2011

(54) SULFONATE FUNCTIONAL ORGANOPOLYSILOXANES

(75) Inventors: John Joseph Kennan, Midland, MI (US); Michael Kang-Jen Lee, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 623 days.

(21) Appl. No.: 11/667,533

(22) PCT Filed: Nov. 18, 2005

(86) PCT No.: PCT/US2005/042273

§ 371 (c)(1),
(2), (4) Date: May 10, 2007

(87) PCT Pub. No.: WO2006/065467

PCT Pub. Date: Jun. 22, 2006

(65) Prior Publication Data

US 2007/0299140 A1    Dec. 27, 2007

Related U.S. Application Data

(60) Provisional application No. 60/636,245, filed on Dec. 15, 2004.

(51) Int. Cl.
*C08G 77/22* (2006.01)

(52) U.S. Cl. .............................. 528/30; 528/25; 528/26; 528/27; 528/28; 528/29

(58) Field of Classification Search ................... 528/30
See application file for complete search history.

(56) References Cited

U.S. PATENT DOCUMENTS

| 4,496,705 | A |   | 1/1985  | Florence et al. |         |
|-----------|---|---|---------|-----------------|---------|
| 4,523,002 | A |   | 6/1985  | Campbell et al. |         |
| 4,525,567 | A |   | 6/1985  | Campbell et al. |         |
| 5,585,186 | A | * | 12/1996 | Scholz et al.   | 428/412 |
| 6,124,490 | A | * | 9/2000  | Gormley et al.  | 556/425 |
| 6,607,717 | B1|   | 8/2003  | Johnson et al.  |         |

OTHER PUBLICATIONS

DOW Chemical Product Information Sheet.*
Journal of Polymer Science, Polymer Chemical Edition, vol. 17, pp. 3559-3636.

* cited by examiner

*Primary Examiner*—Randy Gulakowski
*Assistant Examiner*—Lindsay Nelson
(74) *Attorney, Agent, or Firm*—Alan Zombeck

(57) ABSTRACT

Sulfonate functional siloxane compositions, methods of their preparation, emulsion compositions containing them are disclosed. The compositions are useful in a variety of personal, household, healthcare formulations, as well as fabric and textile treatments.

18 Claims, No Drawings

SULFONATE FUNCTIONAL ORGANOPOLYSILOXANES

CROSS REFERENCE TO RELATED APPLICATIONS

This application is a U.S. national stage filing under 35 U.S.C. §371 of PCT Application No. PCT/US05/042273 filed on 18 Nov. 2005, currently pending, which claims the benefit of U.S. Provisional Patent Application No. 60/636,245 filed 15 Dec. 2004 under 35U.S.C. §119 (e). PCT Application No. PCT/US05/042273 and U.S. Provisional Patent Application No. 60/636,245 are hereby incorporated by reference.

FIELD OF THE INVENTION

The present invention relates to sulfonate functional siloxane compositions, methods of their preparation, emulsion compositions containing them, and their use in a variety of personal, household, healthcare formulations, as well as fabric and textile treatments.

BACKGROUND OF THE INVENTION

Majority of the silicone surfactants used in commercial applications are nonionic, where commonly a polyoxyalkylene provides the hydrophilicity. Cationic silicone surfactants are also known and have found utility, especially in hair care applications. By comparison, anionic silicone surfactants are not as well known, presumably due to the limited and difficult synthetic routes to such materials.

One such route to anionic silicone surfactants is based on the reaction of propane sultone with amino functional siloxanes, such as taught in J. Polymer Science, Polymer Chem. Ed., vol. 17, pp 3559-3636 (1979).

U.S. Pat. No. 4,496,705 teaches a method for producing aminoalkyl-siloxane polymers of a high molecular weight by hydrolyzing a difunctional aminoalkyl-silane prior to incorporation into the siloxane polymer. The high molecular weight siloxane polymers of the '705 patent may be converted to zwitterionic siloxane rubbers by reaction with propane sultone.

U.S. Pat. Nos. 4,525,567 and 4,523,002 teach siloxane polymers containing zwitterions on tertiary silicone atoms and their aminoalkyl siloxane polymer intermediates are provided. The aminoalkyl siloxane polymer intermediates and the zwitterionic siloxane polymers of the '567 and '002 patents are obtained by co-polymerizing trifunctional aminoalkyl silanes or zwitterionic silanes, respectively, with hydroxy-terminated siloxane oligomers in the presence of an acid catalyst. The aminoalkyl siloxane polymer intermediates are converted to zwitterionic siloxane polymer by reaction with an organosultone or an organolactone.

Industrial processes to make an anionic silicone surfactant based on using propane sultone must address the safety issues due to the toxicity of the propane sultone. Also, the sulfonate polymers synthesized from the propane sultone tend to be yellow in color. Thus, a need exists to identify processes to make anionic silicone surfactants, and in particular sulfonate silicone surfactants, using intermediates that are easier to handle than propane sultone. The present inventors have identified such a process based on reacting 2-sulfobenozoic acid cyclic anhydride, sulfobenzoic acid sodium salt or derivatives thereof with an aminofunctional siloxane. The resulting compounds, while being produced by a safer route than using propane sultone, also were found to have unexpected performance benefits in comparison to the anionic silicones prepared by the propane sultone.

SUMMARY OF THE INVENTION

The present invention relates to an organopolysiloxane comprising a sulfonate group having the formula;

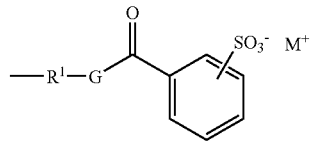

where
R$^1$ is a divalent organic group bonded to the organopolysiloxane,
M is hydrogen, an alkali metal, or a quaternary ammonium group,
G is an oxygen atom, NH, or an NR group where R is a monovalent organic group.

The present invention further provides a process to prepare a sulfonate functional organopolysiloxane comprising reacting a sulfobenzoic acid compound with an amine functional siloxane.

Furthermore, the present invention is related to emulsion compositions comprising the inventive compositions.

The inventive compositions are useful in a variety of industrial applications and can be formulated for uses in personal, household, healthcare, textile, tissue, leather, oil and gas exploitation, military and commercial fire fighting foams.

DETAILED DESCRIPTION OF THE INVENTION

Organopolysiloxanes are well known in the art and are often designated as comprising any number of M units (R$_3$SiO$_{0.5}$), D units (R$_2$SiO), T units (RSiO$_{1.5}$), or Q units (SiO$_2$) where R is independently any monovalent organic group. The organopolysiloxane of the present invention may contain any number or combination of M, D, T, or Q units, but has at least one substituent that is a sulfonate group having the general formula;

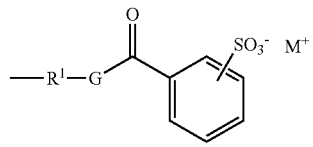

where R$^1$ is a divalent organic group bonded to the organopolysiloxane; M is hydrogen, an alkali metal, or a quaternary ammonium; G is an oxygen atom, NH, or an NR group where R is a monovalent organic group.

The sulfonate group substituent is bonded to the organopolysiloxane via a Si—C bond by the R$^1$ moiety. The sulfonate group substituent can be present in the organopolysiloxane via linkage to any organosiloxy unit, that is, it may be present on any M, D, or T siloxy unit. The sulfonate functional organopolysiloxane can also contain any number of additional M, D, T, or Q siloxy units of the general formula (R$_3$SiO$_{0.5}$), (R$_2$SiO), (RSiO$_{1.5}$), or (SiO$_2$), where R is a monovalent organic group, providing that the organopolysiloxane has at least one siloxy unit with the sulfonate functional group present.

The monovalent organic groups represented by R in the organopolysiloxanes may have from 1 to 20 carbon atoms, alternatively 1 to 10 carbon atoms, and are exemplified by, but not limited to alkyl groups such as methyl, ethyl, propyl, butyl, pentyl, hexyl, heptyl, octyl, undecyl, and octadecyl;

cycloalkyl such as cyclohexyl; aryl such as phenyl, tolyl, xylyl, benzyl, and 2-phenylethyl; amine functional organic groups such as aminopropyl and aminoethylaminoisobutyl; a polyalkylene oxide (polyether) such as polyoxyethylene, polyoxypropylene, polyoxybutylene, or mixtures thereof, and halogenated hydrocarbon groups such as 3,3,3-trifluoropropyl, 3-chloropropyl, and dichlorophenyl. Typically, at least 50 percent, alternatively at least 80%, of the organic groups in the organopolysiloxane may be methyl (denoted as Me).

The $R^1$ group in the sulfonate group substituent can be any divalent organic group, but typically is a divalent hydrocarbon group containing 2 to 6 carbon atoms. Divalent hydrocarbons are represented by an ethylene, propylene, butylene, pentylene, or hexylene group. Alternatively, $R^1$ is a propylene group, —$CH_2CH_2CH_2$— or an isobutylene group, —$CH_2CH(CH_3)CH_2$—.

G in the general formula for the sulfonate substituent group above is an oxygen atom, NH, or an NR group where R is a monovalent organic group. When G is an NR group, R can be any of the monovalent organic groups described above. Typically, G is the NH chemical unit forming an amide group in the sulfonate substituent formula above.

M in the sulfonate group substituent formula can be selected from; hydrogen, an alkali metal such as Li, Na, and K; or a quaternary ammonium group. The selection of M is typically determined by the conditions of processing or chemical environment in which the sulfonate functional organopolysiloxane is subjected. Under acidic to neutral conditions, M will be H. When the sulfonate functional organopolysiloxane is subjected to basic conditions, such as reaction with an alkali metal hydroxide, the sulfonate group may exist as a salt where M is the alkali metal.

The sulfonate group substituent has a —$SO_3^-M^+$ group bonded on the aromatic ring, as indicated in the above structure. The —$SO_3^-M^+$ group may be in the ortho, meta, or para position on the aromatic ring, but typically is in the ortho position as indicated in the structure below;

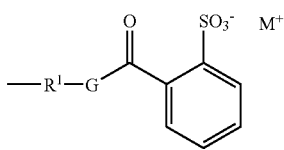

The aromatic ring in the sulfonate group substituent formula may also contain additional substituents on the ring. If substituents are present, they should not be reactive towards amine groups. Suitable ring substituents may be a halogen, nitro, amine, alkyl, aryl, alkylaryl. The aromatic ring as depicted in the sulfonate group substituent can also be part of an extended or fused aromatic ring structure such as napthyl.

The sulfonate group substituent on the organopolysiloxane of the present invention may have one of the following structures;

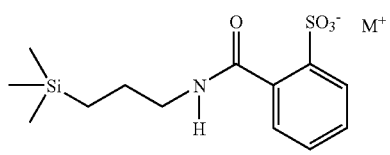

-continued

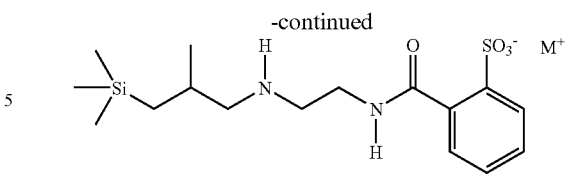

where the Si represents the silicon atom from the organopolysiloxane chain.

The weight average molecular weight ($M_W$) or number average molecular weight ($M_N$) of the sulfonate group functional organopolysiloxane can vary, and is not limiting. The sulfonate group functional organopolysiloxane can be either liquid or solid in form, but are typically solid gum type materials.

The sulfonate functional organopolysiloxane may contain any number of M, D, T, or Q siloxy units of the general formula $(R_3SiO_{0.5})$, $(R_2SiO)$, $(RSiO_{1.5})$, or $(SiO_2)$, where R is a monovalent organic group, providing that the organopolysiloxane has at least one siloxy unit with the sulfonate functional group present. Alternatively, the sulfonate functional organopolysiloxane may be a predominately linear polysiloxane comprising siloxy units having the formula, $MD_xD^S_yM$, or $M^SD_xM^S$ where $D^S$ represents a sulfonate group functional disiloxy unit and $M^S$ represents a sulfonate group functional monosiloxy unit, and x can vary from 0 to 500, y can vary from 1 to 500, alternatively from 1 to 200, or alternatively from 1 to 100.

In another embodiment, the sulfonate functional organopolysiloxane also contains amine functional groups, such as aminopropyl or aminoethylaminoisobutyl groups. The amount of amine functional groups can vary, but typically are present in the organopolysiloxane at a level of 0.01 to 5 meq amine/g, or alternatively from 0.2 to 0.7 meq amine/g.

The sulfonate functional organopolysiloxanes of the present invention can be prepared by any method, but are typically prepared according to the methods taught herein, as described infra.

The present process to prepare a sulfonate functional organopolysiloxane comprises reacting a sulfobenzoic acid compound with an amine functional siloxane.

The amine functional siloxane useful in the present invention can be any organopolysiloxane having at least one amine functional substituent. The organopolysiloxanes thus can have any combination of M, D, T, or Q units, as described above, but must contain at least one amine functional substituent. Typically, the organopolysiloxane is a predominately linear polysiloxane as represented by the average formula, $MD_xD^A_yM$, or $M^AD_xM^A$ where $D^A$ represents an aminofunctional disiloxy unit and $M^A$ represents an aminofunctional monosiloxy unit, where A is an amine functional organic group such as aminopropyl or aminoethylaminoisobutyl, x can vary from 0 to 500, y can vary from 1 to 500, alternatively from 1 to 200 or alternatively from 1 to 100.

Representative, non-limiting commercial examples of amine functional siloxanes useful in the present invention include DC2-8220, DC2-8566, DC2-8040, DC2-8822, DC2-8630 (Dow Corning Corporation, Midland Mich.), and aminopropyl terminated polydimethylsiloxanes such as DMS-A11, DMS-A12, DMSA15, DMSA21, and DMS-A32 from Gelest Incorporation.

The sulfobenzoic acid compound in the present invention may be selected from a sulfobenzoic acid cyclic anhydride or sulfobenzoic acid metal salt. When the sulfobenzoic acid compound is a sulfobenzoic acid cyclic anhydride, it may be 2-sulfobenzoic acid cyclic anhydride or derivatives thereof. A representative non-limiting list of sulfobenzoic acid cyclic anhydride compounds and suitable derivatives thereof, useful in the process of the present invention is shown below.

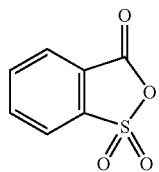
(Sulfobenzoic acid cyclic anhydride)

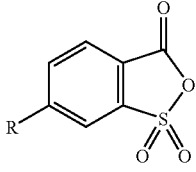

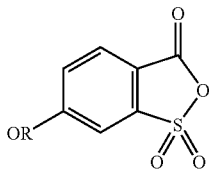

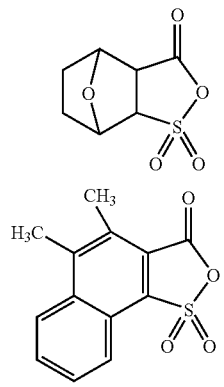

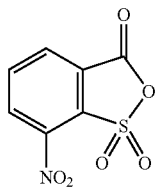

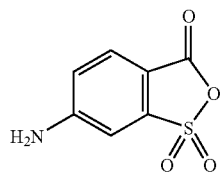

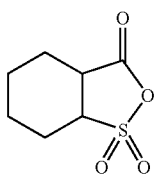

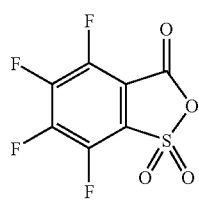

The chemical structure for sulfobenzoic acid sodium salt, and a representative non-limiting list of derivatives thereof, useful in the process of the present invention is shown below.

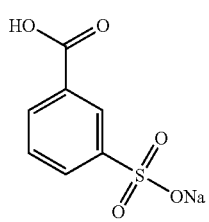
(3-Sulfobenzoic acid sodium salt)

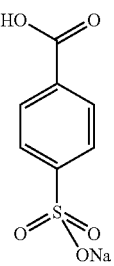

-continued

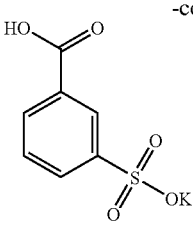

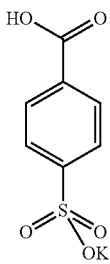

The reaction between 2-sulfobenzoic acid cyclic anhydride and the amine functional siloxane may be conducted under a variety of conditions, but typically occurs by combining the reactants in a suitable solvent and heating the reaction mixture under ambient pressures for sufficient period of time to assure complete reaction.

The amount of each starting material in the reaction can vary, but typically a molar excess of the amine functional siloxane is used (based on the equivalents of amine functionality in the organopolysiloxane) vs the amount of the 2-sulfobenzoic acid, cyclic anhydride used in the reaction. Using an excess of the amine functional organopolysiloxane, and proper reaction conditions, ensures complete consumption of the 2-sulfobenzoic acid cyclic anhydride resulting in a sulfonate functional organopolysiloxane without any residual 2-sulfobenzoic acid cyclic anhydride in the resulting product. Typically, the molar ratio of amine functional siloxane to the sulfobenzoic acid compound ranges from 0.1 to 15, alternatively from 0.1 to 5.

While the reaction can occur solventless, conducting the reaction in a suitable solvent will facilitate the reaction. Suitable solvents are those solvents that do not react with either of the starting materials. Thus, suitable solvents include: aromatic solvents such as benzene, toluene, or xylenes; chlorinated hydrocarbons, such as methylene chloride, chloroform, or carbon tetrachloride, and aprotic organic solvents such as tetrahydrofuran, dimethylformamide, and dioxane.

Once combined, either in a solvent or solventless, the reaction occurs by heating the components. If a solvent is used, the reflux temperature of the solvent will typically control the reaction temperature. If solventless, the components should be heated and allowed to react at a temperature ranging from 25 to 150° C., or alternatively from 50 to 120° C.

Upon completion of the reaction in a solvent, the resulting sulfonate functional siloxane can be isolated by removing the solvent, typically by heating the reaction contents under reduced pressure by techniques known in the art.

The present invention further relates to emulsion compositions comprising the sulfonate functional siloxanes as taught herein. The emulsions are typically water continuous emulsions where the hydrophobic phase comprises the sulfonate functional siloxane. The emulsions can be prepared according to any of the techniques known in the art to prepare emulsions, and in particular emulsions of organopolysiloxanes or silicones. For example, the emulsions of the present invention can be prepared according to the teachings of U.S. Pat. No. 6,607,717, which is hereby incorporated by reference. Typically, emulsions of the present invention can be prepared by combining the sulfonate functional organopolysiloxanes with surface-active agents and water. The surface-active agent can be an anionic, cationic, nonionic, zwitterionic, or any combination thereof.

Some specific representative examples of the surfactants found to be especially useful in the preparation of the emulsions according to the present invention include a mixture of Brij 30 and Brij 35, a mixture of Tergitol® TMN-6 and Tergitol® 15-S-15, a mixture of Genapol® UD 050 and Genapol® UD 110, a mixture of Softanol® 70 and Softanol® 120, a mixture of Lutensol® ON70 and Lutensol® TO5, and Lutensol® ON70 alone. Brij 30 is a polyoxyethylene (4) lauryl ether with an HLB of 9.7 from Uniqema. Brij 35 is a polyoxyethylene (23) lauryl ether with an HLB of 16.9 from Uniqema. Tergitol® TMN-6 is a C12 (twelve carbon) secondary alcohol ethoxylate with an HLB of 11.7 available from the Dow Chemical Company. Tergitol® 15-S-15 is a C11-15 secondary alcohol ethoxylate with an HLB of 15.6 and is also available from the Dow Chemical Company. Genapol® D UD050 with an HLB of 11.0 and Genapol® UD110 with an HLB of 15 are C11 oxo-alcohol polyglycol ethers available from Clariant Corporation. Softanol® 70 is a C12-14 secondary alcohol EO7 (seven ethoxy units) ethoxylate with an HLB of 12.1 available from BP Chemicals. Softanol® 120 is a C12-14 secondary alcohol EO12 (twelve ethoxy units) ethoxylate with an HLB of 14.5 also available from BP Chemicals. Lutensol® ON7 is a C13 oxo-alcohol EO7 ethoxylate with an HLB of 13.0 available from BASF. Lutensol® TO5 is a C10 oxo-alcohol EO5 ethoxylate with an HLB of 10.5 also available from BASF.

The emulsions of the present invention are typically of the "oil in water type". That is, with the silicone in a water based continuous phase. The particle sizes in such emulsions are typically 0.02 to 10 µm, with the ranges 0.02 to 2 µm and 0.02 to 0.2 µm often preferred.

Compositions prepared according to the invention can be used in various over-the-counter (OTC) personal care compositions, health care compositions, and household care compositions, but especially in the personal care arena. Thus, they can be used in antiperspirants, deodorants, skin creams, skin care lotions, moisturizers, facial treatments such as acne or wrinkle removers, personal and facial cleansers, bath oils, perfumes, colognes, sachets, sunscreens, pre-shave and after-shave lotions, liquid soaps, shaving soaps, shaving lathers, hair shampoos, hair conditioners, hair sprays, mousses, permanents, depilatories, hair cuticle coats, make-ups, color cosmetics, foundations, blushes, lipsticks, lip balms, eyeliners, mascaras, oil removers, color cosmetic removers, nail polishes, and powders.

EXAMPLES

The following examples are presented to further illustrate the compositions and methods of this invention, but are not to be construed as limiting the invention. All parts and percentages in the examples are on a weight basis and all measurements were obtained at 23° C., unless indicated to the contrary.

Materials

AFS1 is DC2-8220 (Dow Corning Corporation, Midland Mich.), a 150 cS (mm$^2$/s) dimethylsiloxane copolymer containing approximately 2 mole percent aminoethylaminoisobutyl methylsiloxane (0.507 meq amine/g).

AFS2 is DC2-8630 (Dow Corning Corporation, Midland Mich.), a 900 cS (mm$^2$/s) dimethylsiloxane copolymer containing approximately 1 mole percent aminopropylsiloxane (0.267 meq amine/g).

Example 1

Preparation of a Sulfonate Functional Siloxane from an Amino-Functional Siloxane and Sulfobenzoic Acid Cyclic Anhydride 33% of the Amine Hydrogens Reacted A 500 mL three-necked flask was loaded with 100.39 g of AFS1, 4.71 g 2-sulfobenzoic acid cyclic anhydride (SBAA) and 100.24 g toluene. The reaction mixture was heated to 80° C. while stirring under static nitrogen, and then held at this temperature for 4 hours. The resulting mixture was vacuum stripped to remove toluene and was dried completely by placing in a 60° C. vacuum oven overnight. Finally, 92.73 g of product was collected. The dried material was a clear, slightly yellow, high viscosity gum. The gum did not dissolve in water or alcohol, but did dissolve in toluene, tetrahydrofuran, and chloroform. The resulting polymer had a number average molecular weight $M_n$=4,261 with a polydispersity of 3.92.

Example 2

Comparative

Preparation of a Sulfonate Functional Siloxane from Amino-Functional Siloxanes and Propane Sultone 33% of the Amine Hydrogen Reacted A three necked 500 mL flask was loaded with 100.03 g of AFS1, 3.12 g propane sultone and 209.9 g toluene. The reaction mixture was heated to 65° C. while stirring under static nitrogen for 2 hours. Then the mixture was heated to 80° C. and held at this temperature for 2 hours. The resulting mixture was vacuum stripped to remove toluene and was dried completely by placing in a 60° C. vacuum oven overnight. Finally 93.41 g of product was collected. The dried material was a clear, yellow high viscosity gum. The gum did not dissolve in water or alcohol, but did dissolve in toluene, tetrahydrofuran, and chloroform. The resulting polymer had a number average molecular weight $M_n$=4,4061 with a polydispersity of 2.69.

Example 3

Preparation of a Sulfonate Functional Siloxane from an Amino-Functional Siloxane and Sulfobenzoic Acid Cyclic Anhydride 33% of the Amine Hydrogens Reacted A 1 L three-necked flask was loaded with 200.04 g of AFS1, 9.44 g 2-sulfobenzoic acid cyclic anhydride (SBAA) and 414.0 g toluene. The reaction mixture was heated to 80° C. while stirring under static nitrogen, and then held at this temperature for 4 hours. The resulting mixture was vacuum stripped to remove toluene and was dried completely by placing in a 60° C. vacuum oven overnight. Finally, 189.60 g of product was collected. The dried material was a clear, slightly yellow, high viscosity gum. The gum did not dissolve in water or alcohol, but did dissolve in toluene, tetrahydrofuran, and chloroform. The resulting polymer had a number average molecular weight $M_n$=7,750.

Example 4

Comparative

Preparation of a Sulfonate Functional Siloxane from Amino-Functional Siloxanes and Propane Sultone

33% of the Amine Hydrogen Reacted

A three necked 1 L flask was loaded with 200.01 g of AFS1, and 399.8 g toluene and heated to 75° C. while stirring under static nitrogen for 2 hours. Then, 6.29 g propane sultone was slowly added. Addition time was 10 minutes. Then the mixture was heated to 80° C. and held at this temperature for 4 hours. The resulting mixture was vacuum stripped to remove toluene and was dried completely by placing in a 60° C. vacuum oven overnight. Finally 189.1 g of product was collected. The dried material was a clear, yellow high viscosity gum. The gum did not dissolve in water or alcohol, but did dissolve in toluene, tetrahydrofuran, and chloroform. The resulting polymer had a number average molecular weight $M_n$=3,340.

Example 5-1

Preparation of a Sulfonate Functional Siloxane from an Amino-Functional Siloxane and Sulfobenzoic Acid Cyclic Anhydride

25% of the Amine Hydrogens Reacted

A 1 L three neck flask was loaded with 200.17 g of AFS2, 5.05 g 2-sulfobenzoic acid cyclic anhydride and 385.44 g toluene. The reaction mixture was heated to 80° C. while stirring under static nitrogen, and then held at this temperature for 4 hours. The sample solution was vacuum stripped to remove most of the toluene and was dried completely by placing in a 60° C. vacuum oven overnight. Finally, 187.80 g of product was collected. The dried material was a clear, high viscosity gum. The dried material was a clear, yellow high viscosity gum. The gum did not dissolve in water or alcohol, but did dissolve in toluene, tetrahydrofuran, and chloroform. The resulting polymer had a number average molecular weight $M_n$=17,400.

Example 5-2

Preparation of a Sulfonate Functional Siloxane from an Amino-Functional Siloxane and Sulfobenzoic Acid Cyclic Anhydride

15% of the Amine Hydrogen Reacted

A 500 mL three neck flask was loaded with 100.01 g of AFS2, 1.52 g 2-sulfobenzoic acid cyclic anhydride and 190.23 g toluene. The reaction mixture was heated to 80° C. while stirring under static nitrogen, and then held at this temperature for 4 hours. The sample solution was vacuum stripped to remove most of the toluene and was dried completely by placing in a 60° C. vacuum oven overnight. Finally, 96.17 g of product was collected. The dried material was a clear high viscosity fluid. The fluid did not dissolve in water or alcohol, but did dissolve in toluene, tetrahydrofaran and chloroform. The sulfonate polymer from Example 5 was blended with 10% of a high molecular weight alcohol (Isofol 12).

Comparison of the viscosity for these materials with the starting amine functional fluids is listed in Table I. Polymer A as listed in Table I was obtained by blending 90% of polymer prepared from Example 3 with 10% of a high boiling point alcohol (Isofol 12). Polymer B was obtained by blending 90% of polymer prepared from Example 5-1 with 10% of Isofol 12.

TABLE I

| Polymer | Initial Amine Content (mole %) | Targeted % N—H Reacted (%) | Viscosity cSt (mm²/s) |
|---|---|---|---|
| AFS-1 | 2 | 0 | 150 |
| A | 2 | 33 | 198,600 |
| AFS-2 | 1 | 0 | 2,900 |
| Example 5-2 | 1 | 15 | 242,600 |
| B | 1 | 25 | 124,800 |

Example 6

Comparative Example

Preparation of a Sulfonate Functional Siloxane from an Amino-Functional Siloxane and Propane Sultone

26% of the Amine Hydrogen Reacted

A three necked 1 L flask was loaded with 200.02 g of AFS2, and 401.61 g toluene and heated to 75° C. while stirring under static nitrogen for 2 hours. Then, 3.43 g propane sultone was slowly added. Addition time was 10 minutes. Then the mixture was heated to 80° C. and held at this temperature for 4 hours. The resulting mixture was vacuum stripped to remove toluene and was dried completely by placing in a 60° C. vacuum oven overnight. Finally 195.0 g of product was collected. The dried material was a clear, yellow high viscosity gum. The gum did not dissolve in water or alcohol, but did dissolve in toluene, tetrahydrofuran, and chloroform. The resulting polymer had a number average molecular weight $M_n$=7130.

Example 7

Emulsions Prepared from Sulfonate Siloxanes

Emulsions were prepared from the sulfonate siloxane polymers of Examples 3-6. Compositions for these samples are listed in Table II.

TABLE II

| | Example # | | | |
|---|---|---|---|---|
| Polymer: | 7A | 7B | 7C (comparative) | 7D (comparative) |
| Example 5 | 16 g | — | — | — |
| Example 3 | — | 16 g | — | — |
| Example 4 (comparative) | — | — | 16 g | — |
| Example 6 (comparative) | — | — | — | 16 g |
| Permethyl 99A | 4 g | 4 g | 4 g | 4 g |
| Genapol UD050 | 3 g | 3 g | 3 g | 3 g |
| Genapol UD110 | 7 g | 7 g | 7 g | 7 g |
| ANTI 1520 | 3 drops | 3 drops | 3 drops | 3 drops |
| Water | 70 g | 70 g | 70 g | 70 g |
| Total | 100 g | 100 g | 100 g | 100 g |

TABLE II-continued

| | Example # | | | |
|---|---|---|---|---|
| Polymer: | 7A | 7B | 7C (comparative) | 7D (comparative) |
| Emulsion Particle Sizes (μm) | 2.491 | 0.662 | 2.843 | 4.170 |
| Stability (5 days at Room Temperature) | Yes | Yes | No | No |

Emulsions prepared from propane sultone synthesized polymers were not stable. They were slightly yellow in color and phase separated within 5 days at room temperature.

Example 8

Preparation of a Sulfonate Functional Siloxane from an Amino-Functional Siloxane and Sulfobenzoic Acid Sodium Salt A 500 mL three neck flask was loaded with 100.01 g of AFS1, 9.04 g 3-sulfobenzoic acid sodium salt (SBAS) and 201.52 g toluene. The reaction mixture was heated to 80° C. while stirring under static nitrogen, and then held at this temperature for 4 hours after adding 5.02 g of water. The resulting mixture was vacuum stripped to remove toluene and was dried completely by placing in a 60° C. vacuum oven overnight. Finally, 96.14 g of product was collected. Polymer was dissolved in toluene, filtered through a 0.8 um filter paper and dried in a 60° C. vacuum oven overnight again. The final copolymer showed viscosity of 1.14 million cS (mm²/s) when measured by a Brookfield viscometer at 25° C.

Example 9

Preparation of a Sulfonate Functional Siloxane from an Amino-Functional Siloxane and Sulfobenzoic Acid Sodium Salt A 500 mL three neck flask was loaded with 100.02 g of AFS2, 3.02 g 3-sulfobenzoic acid sodium salt (SBAS) and 201.74 g toluene. The reaction mixture was heated to 80° C. while stirring under static nitrogen, and then held at this temperature for 4 hours after adding 5.04 g of water. The resulting mixture was vacuum stripped to remove toluene and was dried completely by placing in a 60° C. vacuum oven overnight. Finally, 95.67 g of product was collected. Polymer was dissolved in toluene, filtered through a 0.8 um filter paper and dried in a 60° C. vacuum oven overnight again. The final copolymer had a viscosity of 127,400 cS (mm²/s) when measured by a Brookfield viscometer at 25° C.

The invention claimed is:

1. An organopolysiloxane comprising a sulfonate group having the formula;

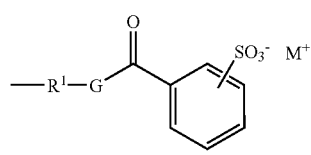

where $R^1$ is a divalent organic group bonded to the organopolysiloxane,

M is hydrogen, an alkali metal, or a quaternary ammonium group,

G is an oxygen atom, NH, or an NR group where R is a monovalent organic group, wherein the organopolysiloxane is a predominately linear polysiloxane comprising siloxy units having the formula $MD_xD_y^SM$ or $M^SD_xM^S$ where D represents a disiloxy group, $D^S$ represents a sulfonate group functional disiloxy unit and M represents a monosiloxy group, $M^S$ represents a sulfonate group functional monosiloxy unit, and x can vary from 0 to 500, y can vary from 1 to 500.

2. The organopolysiloxane of claim 1 further comprising amine functional groups.

3. The organopolysiloxane of claim 1 wherein the amine functional group is aminopropyl or aminoethylaminoisobutyl.

4. The organopolysiloxane of claim 1 wherein $R^1$ is propylene.

5. The organopolysiloxane of claim 1 wherein M is an alkali metal.

6. The organopolysiloxane of claim 5 wherein the alkali metal is sodium.

7. The organopolysiloxane of claim 1 wherein G is NH.

8. The organopolysiloxane of claim 1 wherein the sulfonate group has the formula

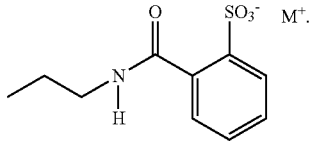

9. The organopolysiloxane of claim 1 wherein the sulfonate group has the formula

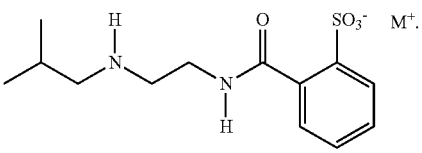

10. A process to prepare a sulfonate functional organopolysiloxane comprising reacting a sulfobenzoic acid compound with an amine functional siloxane, wherein the amine functional siloxane is a predominately linear polysiloxane as represented by the average formula, $MD_xD_y^AM$, or $M^AD_xM^A$ where D represents a disiloxy unit, $D^A$ represents an aminofunctional disiloxy unit and M represents a monosiloxy group, $M^A$ represents an aminofunctional monosiloxy unit, x can vary from 0 to 500, and y can vary from 1 to 500.

11. The process of claim 10 wherein the sulfonate functional organopolysiloxane is a sulfobenzoic acid cyclic anhydride.

12. The process of claim 10 wherein the sulfonate functional organopolysiloxane is 2-sulfobenzoic acid cyclic anhydride.

13. The process of claim 12 wherein the sulfonate functional organopolysiloxane is a sulfobenzoic acid metal salt.

14. The process of claim 12 wherein the sulfonate functional organopolysiloxane is 3-sulfobenzoic acid sodium salt.

15. The process of claim 12 wherein the molar ratio of amine functional siloxane to the sulfobenzoic acid compound ranges from 0.1 to 15.

16. The sulfonate functional organopolysiloxane prepared by the process of claim 12.

17. An emulsion comprising the sulfonate functional organopolysiloxane composition of claim 1.

18. An emulsion comprising the sulfonate functional organopolysiloxane composition of claim 16.

* * * * *